Dec. 5, 1967 D. S. WISE 3,356,943
METHOD AND APPARATUS FOR MEASURING VOLTAGE AND CURRENT
Filed Oct. 5, 1962 2 Sheets-Sheet 1

INVENTOR.
DAVID S. WISE
BY
*J. D. Douglass*
His ATTORNEY

Dec. 5, 1967  D. S. WISE  3,356,943
METHOD AND APPARATUS FOR MEASURING VOLTAGE AND CURRENT
Filed Oct. 5, 1962  2 Sheets-Sheet 2

INVENTOR.
DAVID S. WISE
BY
*J. D. Douglass*
*his* ATTORNEY

United States Patent Office 3,356,943
Patented Dec. 5, 1967

3,356,943
METHOD AND APPARATUS FOR MEASURING VOLTAGE AND CURRENT
David S. Wise, Cleveland, Ohio, assignor to Western Reserve Electronics, Inc., Cleveland, Ohio, a corporation of Ohio
Filed Oct. 3, 1962, Ser. No. 228,186
17 Claims. (Cl. 324—98)

This invention relates to electrical measuring instruments and more particularly to a passive instrument for the measuring of potential and current and a method of measuring potential or current.

Heretofore there have been many instruments on the market which are capable of making the above measurements and which are combined in one instrument. The potential or voltage measuring instrument is usually connected across the source of potential. Various ranges of voltages may be measured by inserting multiplying resistances in series with the meter; the greater the series resistance the higher the voltage that can be measured.

The current measuring function is effected by inserting the meter in series with the potential and the range is changed by placing conductances (resistance) in shunt with the meter.

In the potential or current measuring device the meter was used to measure a range of voltages wherein the position of the indicator or hand of the meter relative to a scale, indicated the amount of potential or current in that particular range. When the range was changed, the hand on the meter was merely correlated with a different scale, the dial usually being provided with different scales for each range.

Although the above has been satisfactory for many years, there has been a defect present which was largely ignored particularly where the instruments were of the passive and portable type. This defect resided in the fact that a meter is not normally an accurate device and is usually only accurate at a certain point on the dial. In other words, a meter may be calibrated for one point on the dial, usually at full scale, and may be fairly accurate at this point but, at other points, the calibration does not apply. As is well known the accuracy as among different meters may vary. More costly meters may have a higher degree of accuracy, such as a rating of .5 to 1%. Meters for general use, however, usually have an accuracy of 2%. The accuracy percentage refers only to full-scale reading in the range in which it is used. If the range used was 100 volts, the reading at 100 volts could actually be 2 volts off. When readings are taken at the top end or full scale this error may not be too important, but at the other end of the scale however, an error of 2 volts for a 10 volt reading would be in error by 20%.

It is apparent that a meter may be designed where the accuracy may be the greatest at another point on the scale other than the full-scale point. True, a meter could be calibrated for this one point and then series or shunt resistance placed in the circuit selectively by switching means to cause the meter to always read at this particular point but this results in an extremely bulky and costly instrument, since it required a multitude of resistors and a costly switching means. Furthermore there are certain points where it would be difficult to quickly determine the necessary resistance to be used in the series or shunt because the resolution would vary, i.e., the resolving resistance might be swamped out by the resistance already in the series or shunt circuit.

It should be pointed out that a meter has a certain sensitivity, that is a certain amount of current must flow through the meter to deflect the indicator a predetermined amount. This sensitivity is determined by the particular construction of the meter. Therefore if a meter is calibrated for the highest degree of accuracy at a predetermined point, the sensitivity of the meter may be determined for this point. However, the sensitivity for the meter at other points will vary and it is only happenstance that an ordinary run of the mine meter will have accuracy at more than one point and, as stated, such inaccuracy as exists at the calibrated point, if it is up scale, becomes greater as the pointer moves down scale.

The present invention contemplates a method and apparatus whereby a meter, which may be accurately calibrated at only one point, may be used to accurately measure currents or voltages in a wide range, by causing the meter to read in all the ranges and for all voltages or currents at the calibrated point. It is apparent that the meter in carrying out the foregoing, performs the function of an indicator and that although the meter is desirable, for purposes which will later appear, it is possible by the present invention to substitute an indicator in place of a meter which is not a meter in the ordinary sense at all.

Briefly, the invention is carried out by the use of a circuit in conjunction with the meter or indicator where the circuit passes the rated current through the meter or indicator to cause it to always read at a predetermined calibrated scale point. Thus if a potential or current is to be measured, the current or potential is controlled so that the proper potential or current always presents to the meter or indicator, current of a proper value for which the point on the scale has been determined. This can be done by a dialing mechanism which inserts resistance into the circuit in an orderly manner. The value of the means for controlling the current or potential may then be used to interpret the value of the source of current or potential being measured in volts and amperes.

By the present invention it is possible to provide an indicator circuit wherein the input resistance is maintained at a constant value while providing the desired current and voltage to the indicator within the circuit to enable the range to be extended with a simple digital means and to eliminate superfluous non-significant figures.

As previously stated, an indicator could be used, the only characteristic of which could be compared to a meter would be that it indicated, upon the application of a predetermined current, but that a meter was sometimes preferred. When a meter is used it may first be used in a search mode as a conventional meter to give a rough indication of the potential or current. Circuit means are provided for shifting the meter from the search mode to that of an indicator and the dialing out of the proper voltage or current can be accomplished quicker because the dials can be set to the rough reading of the voltage or current in the search mode, and then the exact reading of the potential or current dialed until the meter pointer arrives at the predetermined calibrated point on the scale.

This is done by providing an indicator having a predetermined sensitivity at a certain point and applying a voltage or current to the indicator. In the indicator circuit the voltage and/or current is dropped or by-passed by inserting resistances or conductances in series or parallel respectively by a suitable digital mechanism until the applied voltage or current is at the predetermined value to match the sensitivity of the indicator and the voltage or current being measured is then read by the amount of resistance or conductance dialed into the indicator circuit directly in voltage or current by the digits on the dials. As will later appear, it is possible to provide an extremely small and compact mechanism, which is highly portable and where the voltage or current can be read to three or more significant figures.

Still another advantage of the invention, and the invention itself, will become more apparent from the following description of some embodiments thereof, which description is illustrated by the accompanying drawings and forms a part of this specification.

In the drawings.

Through the drawings, like parts have been designated by like reference characters.

Figure 1:
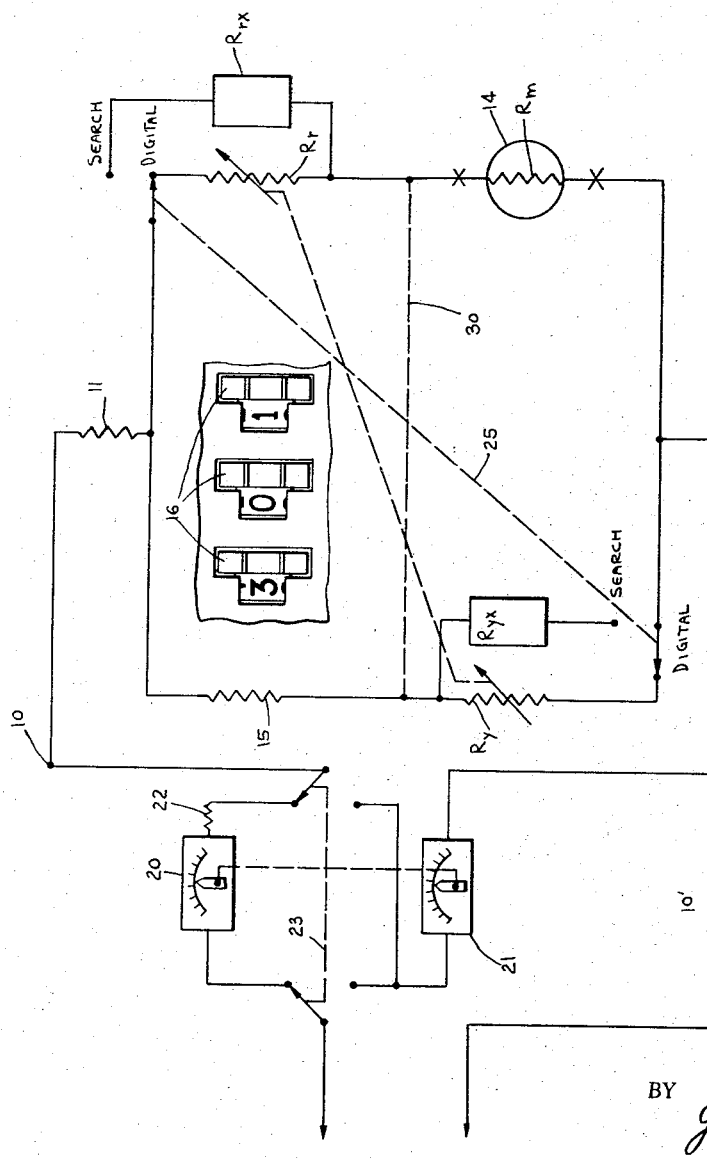
FIG. 1 is a schematic of one form of the invention.

Referring now to FIG. 1, there is illustrated a circuit diagram showing one embodiment of the indicator circuit and its indicating means. A pair of input terminals are provided and have the upper terminal 10 connected through a fixed resistor 11 to a pair of legs, one of which contains a variable resistance $R_r$ in series with a meter 14 having a known resistance $R_m$. The other leg includes in series a fixed resistance 15 and a variable resistance $R_y$. The other ends of the legs are then connected to the other input terminal 10'.

The resistor 11 is not essential to the basic operation of the device and is inserted because it raises the resistance at the input terminals a predetermined amount, which may be desirable in conjunction with the choice of simple multiplier resistances used to extend the range. The resistance 15 is equal to the resistance of the indicator 14. The two variable resistances $R_y$ and $R_r$ are mechanically ganged together. It is pointed out that these last two resistors are merely shown as being variable resistances in the interest of clarity of explanation of the operation and that actually these should consist of a plurality of fixed resistors combined with a suitable switch means controlled by digital dials, whereby the exact amounts of resistances may be switched into the separate legs of the circuit. This enables a greater economy in manufacture with a higher degree of accuracy than would otherwise be practicable with continuously variable resistors. The switch means may include three separate decks 16 controlled by three separate number wheels, the first on the left, of which (tenths) is marked with digits from 1 to 9, the second( (hundredths) from 0 to 9, and the third (thousandths) from 0 to 10, whereby the amount of resistance inserted in the legs can be read as voltages or current by the digits, to three significant figures.

Since the various parameters of the circuit are determined by the type of indicator, this will be discussed first. As previously stated, the indicator may be a meter and in this respect nearly any ordinary meter may be used so long as the sensitivity is known. The sensitivity rating of the meter is determined by the amount of current necessary to deflect the pointer a predetermined amount. This in turn is determined by the particular construction of the meter. In this instance, the sensitivity is selected for a deflection of the pointer for the mid point or one-half of the scale. The selection of this point is arbitrary and is based on the fact that it provides several advantages in that it is a point that is easy to read, enables an interpretation to be made as to whether the digit wheels are to be moved up or down scale to bring the pointer to the fixed point and, as will later appear, assists in what is termed a "search" mode of operation. Other points could be selected, however, as long as the extreme ends of the scale are avoided.

Although for this particular disclosure a meter having a certain sensitivity is described, it will be apparent that meters of different sensitivity may be used and that the invention is by no means limited to a meter or indicator of the sensitivity used in the description.

In this particular case, the meter selected has a resistance of 2400 ohms. The resistance 15 also has 2400 ohms. The meter pointer is at mid scale when 10 microamperes of current are applied at .024 volt. The resistor 11 has a resistance of 100 ohms. As previously stated, the resistor 11 is used to bring the entire resistance of the indicator circuit up to 2500 ohms across the input terminals 10—10' which simplifies the choice of resistance used to extend the range readings by the use of multiplying resistors. It can be seen that if the resistance $R_y$ was infinite (open circuit) and the resistance $R_r$ a short circuit, the input resistance at the terminals 10 would be 2500 ohms.

As is usual with voltage and current measuring devices, the input terminals are placed across or in series with the potential or current to be measured. It is apparent that when used as a voltmeter the device should draw minimum current and when used as a current meter it should have a minimum voltage drop. The resistances $R_y$ and $R_r$ are so arranged that the resistance may be changed in steps and that as the one resistance is raised the other is lowered and vice versa, so that the input resistance at 10—10' is always 2500 ohms. The ranges are changed by inserting resistance or conductance multipliers 20 or 21 in series or in shunt with the terminals 10 exterior of the indicator circuit by means of a ganged switch 23. At the lowest setting, within the indicator circuit, the shunt resistance $R_y$ would be infinite (open) and the series resistance $R_r$ zero (short). At this time it would be able to read 10 microamperes of current or .025 volt of potential. A first multiplier 22 of 7500 ohms is added in the exterior circuit when the device is switched to the voltage measuring function in the first range, and therefore the total resistance seen by the potential is 10,000 ohms. Since the meter draws 10 microamperes it will then read .1 volt to three significant figures.

If the pointer did not move to the predetermined point on the dial, but was upward of the mid scale point, it is apparent that more than .1 volt was being measured, and a first resistance and a first conductance would be "dialed" into the circuit at $R_y$ and $R_r$. In this case if the next step is to arrange the indicator circuit to measure .101 volt, a shunt resistance of 240K ohms ($R_y$) and a series resistance of 24 ohms ($R_r$) would be put into the circuit by the dial switches. In this instance it would be done by actuating the third or 1/1000 dial. If the potential being measured was .101 volt, then the indicator pointer would be centered on the scale. Thus, one of the reasons for using a meter with a pointer that for desired current is read at mid-scale is that it can be quickly determined that the different resistances are necessary in the two legs of the circuit and whether they are to be increased or decreased.

If the device is to be used to measure current, a function and range shifting switch would eliminate the 7500 ohm series resistance and the terminals 10 would be placed directly in series with the current source. On the first range, at this time, the same as for measuring voltage, the shunt resistance $R_y$ is infinite and the series $R_r$ is zero, and therefore since the meter reads 10 microamperes for the desired point of indication, if the current is 10 microamperes the pointer will be centered, the total resistance presented being 2500 ohms. Should the current be larger, the pointer would move up scale, indicating that more than 10 microamperes of current are passing through the circuit, in which event the same resistance previously mentioned would be "dialed" into the legs of the indicator circuit. This would make resistance $R_y$ in shunt 240K ohms and the series resistance $R_r$ 24 ohms; the pointer would now be centered and if the current was 10.1 microamperes, the dials would so indicate.

From this it can be seen that, when measuring voltage, the dials may be used to extend the range within the indicator circuit from .1 volt to .999 volt before another multiplier resistance needs to be added ahead of the indicator circuit. Actually, as was previously pointed out, the .001 dial is provided with 10 digits and therefore the range covered is from .1 to 1 volt. This is a matter of convenience, since it could be from .1 to .999 as stated, likewise the current range is extended within the indicator circuit in the same manner.

There is a definite mathematical relationship between the resistors that are inserted at $R_y$ and $R_r$ which in turn is related to the resistance of the indicator, which is used as a base for the computation of the resistance to maintain the input resistance constant while providing the desired distribution of voltage and current within the indicator, to enable the range to be extended and to enable digitizing the current and voltage within the range selected. This may be stated as:

$$R_y \text{ (shunt)} = \frac{\text{base } R \text{ of indicator}}{N_1 - 1}$$

$R_r$ (series) $= (N_1 - 1)$ base $R$ of indicator for one significant figure. For three significant figures the formulae become $$R_y = \frac{\text{base } R \text{ of indicator}}{(N_1 - 1) + \frac{N_2}{10} + \frac{N_3}{100}}$$

$$R_r = \left[ (N_1 - 1) + \frac{N_2}{10} + \frac{N_3}{100} \right] \text{ base } R \text{ of indicator}$$

where $N_1$ is the integer number of the first significant figure, $N_2$ the second figure etc. If a greater number of significant figures (sf) were desired it would only be necessary to add $$\frac{N_4}{1000}, \frac{N_5}{10,000} \cdots \frac{N_{sf}}{10^{sf-1}}$$

to the above equations.

Thus the value of conductance $R_y$ and resistance of $R_r$ can be determined for any meter. With a meter of the type indicated above having 2400 ohms resistance the formulae for three significant figures would become $$R_y = \frac{2400 \text{ ohms}}{(N_1 - 1) + \frac{N_2}{10} + \frac{N_3}{100}}$$

$$R_r = \left[ (N_1 - 1) + \frac{N_2}{10} + \frac{N_3}{100} \right] 2400 \text{ ohms}$$

In the above formula $R_y$ is the shunt conductance desired and $R_r$ is the series resistance desired. 2400 ohms is the resistance of the meter. $N_1$ is the integer number of the first order of digits, or first significant figure; $N_2$ is the integer number of the second order of digits and $N_3$ the integer number of the third order of digits. If $N_1 = 1$ and $N_2$ and $N_3$ each $= 0$, applying the above formulae for the lowest resolving R for .1 volt $$R_y = \frac{2400}{(1-1) + \frac{0}{10} + \frac{0}{100}} = \text{infinity or open circuit as previously stated}$$

$$R_r = \left[ (1-1) + \frac{0}{10} + \frac{0}{100} \right] 2400 = 0 = \text{short circuit}$$

on the lowest current range. $R_y$ was infinite or an open circuit and at the same time $R_r$ was 0 or a short circuit. Therefore the effective resistance of the circuit is 2500 ohms and the current in the circuit would drive the meter to the 10 microampere point.

Again, if the meter pointer was up scale because the voltage being measured was more than .1 volt, and, .101 volt were dialed, a shunt resistance of 240K ohms and series resistance of 24 ohms would be inserted at $R_y$ and $R_r$. The formulae would be used to resolve the amount of resistance to be inserted as follows:

$$R_y = \frac{2400}{(1-1) + \frac{0}{10} + \frac{1}{100}} = 240K$$

and $$R_r = \left[ (1-1) + \frac{0}{10} + \frac{1}{100} \right] 2400 = 24$$

Thus it is seen that the amount of resistance $R_y$ or $R_r$ which is to be in the legs may be determined for any setting of the dials and this resistance inserted into the circuit by merely turning the dials to the desired point, and the effective resistance remains 2500 ohms.

It is apparent that the switches controlled by the dials and the resistors selected thereby are such that the number of resistors is not unduly amplified.

It is pointed out that in the first position of $R_r$ for the first significant figure, which may be tenths as in the example, is actually zero ohms resistance when the first digit "1" is dialed, and 2400 ohms when the second digit "2" is dialed, and that as the digit wheels are dialed to larger numbers the resistance which controls the first digit increase in arithmetic progression, 0; 2400; 4800; 7200 etc. It is therefore apparent that the first integer or number wheel is offset in that when on "1" there is no resistance in the $R_r$ leg and when on "2" there is 2400 ohms. The other number wheels, however, start with 0 and the second integer wheel runs to 9 and the third or $\frac{1}{1000}$ wheel from 0 to 10 as stated.

$R_y$ started out with an open circuit on the first digit, and, on the second digit became 2400 ohms, and, in the third digit 1200 ohms, and, in the fourth digit 800, etc. It is apparent that $R_y$ may be considered as a conductance and when so considered, it likewise varies conductively as an arithmetic progression with a similar offsetting in the first number wheel.

The resultant input resistance to the indicator circuit is always 2400 ohms plus 100 ohms, or 2500 ohms, with the result that the indicator circuit can be used with conventional multiplying resistance to extend the ranges as desired.

It is therefore apparent that in the indicator circuit two important things occur when measuring current or potential, (1) the meter always receives the rated current for the calibrated point and, (2) the input resistance to the circuit is always 2500 ohms. This provides the greatest accuracy of reading and enables the circuit ranges to be extended by simple multipliers.

It should be noted that although the circuit shown in full lines in FIG. 1 is the preferred circuit, that the concepts of the invention may also be realized by connecting the junction of $R_r$ and 14 to the junction of 15 and $R_y$ as shown by the dotted line 30. This is not as desirable as in the full line circuit because the meter resistance has a temperature coefficient which, even if attempted to be corrected, still results in a slight variable. As can be seen from the diagram, any variation in the meter resistance has a direct effect on the current dividing properties of the circuit, whereas in the first form, when a meter is used, the resistance thereof only becomes part of the total resistance on that portion of the circuit that effects the current dividing properties and therefore slight changes in the meter resistance has only a minimal effect on current division. Furthermore, the shunt resistance across the meter causes it to be sluggish in operation. It is apparent, however, that the alternate circuit configuration would be useful in conjunction with an indicator which did not have the inherent characteristics of a meter.

Search

It is appaernt that a device of the character described is very accurate in its measurements. The very accuracy of the device, however, leads to a certain difficulty in that the voltage or current being measured with the instrument in the "digital" positions could be so far from the initial digital setting that it would take more than the desired time to dial in the necessary resistance at $R_y$ and $R_r$ to enable a measurement to be made.

In order to more quickly determine the approximate desired setting for a voltage or a current within the range for which it is set, close enough so that the exact resistance may be dialed more quickly, the device is converted by a simple switching mechanism to a "search" position where it operates, within certain limits, as a conventional meter. This is effected by a "mode" switch 25 which is moved from the "digital" to a "search" position. In that position resistances $R_{yx}$ and $R_{rx}$ are inserted in place of $R_y$ and $R_r$, which are equal to the amount of conductance and resistance that would otherwise be inserted by the variable resistors $R_y$ and $R_r$ to cause the meter to read at center scale for a certain voltage or current. In other words, on the lowest range the amount of resistance at $R_y$ and $R_r$ inserted by the search switch will be the same as would be inserted by the dials if .5 volt was being measured; at this time the pointer would indicate .5 volt on the .1 to 1 volt scale or mid-point. If the voltage being measured at this time happened to be .5 volt, the pointer would read at mid scale, otherwise any voltage between .1 and 1 volt would operate the pointer in a conventional manner. If the pointer indicated .750 volt, which would be quickly observed in the search range, then the dials would be moved to dial in .750 volt and the search switch moved to the "digital" position after which the exact amount of resistance could be dialed in to cause the meter indicator to move to the mid-point on the scale and then the exact voltage read from the dials. The pointer at this stage merely acts as an indicator.

The range switch inserts the desired shunt or series multipliers for selecting the desired range. The mode switch inserts in the circuit the necessary resistors $R_{yx}$ and $R_{rx}$ in place of $R_y$ and $R_r$, to enable a reading to be made on the midpoint of the selected range by the meter. In the "search" mode, the meter acts as a conventional meter when a voltage is applied that is within that particular range. Thus, by shifting the mode switch first to "search" position and then the range switch to the proper range, a rough measurement of the voltage or current being measured can be quickly determined, which is still as accurate as a conventional meter, and the dials then quickly set to the rough indication and after switching to "digital" the pointer may be brought to the critical mark on the dial, in the manner described.

*Alternating current*

Heretofore alternating current and voltage measuring instruments of the passive type have had certain inherent disadvantages. One of these was the fact that they would not measure low voltage with a very high degree of accuracy. Normally the lowest range was from 0 to 2.5 volts full scale and the scale was greatly compressed at the lower end, making the reading of the lower voltages more or less guess work. In all of the lower ranges the scale was very non-linear across the entire dial, due to the fact that the meter used was a direct current meter and the voltage being measured was rectified by a non-linear detector before being applied to the meter. These two defects caused a compounding of errors with the resultant inaccuracy. Such meters had to use separate scales for different ranges. Only in the higher ranges did linearity of the detector, due to the higher voltage being measured, result in a certain degree of accuracy, and even in these ranges the meter was still only accurate at full scale.

The present invention enables an alternating voltage and current measuring instrument to be made where the cause for inaccuracies of the prior art have no effect on the accuracies of the instrument by virtue of the fact that an alternating current detector can be calibrated at one point and used in place of the previously described indicator.

The present invention also enables an alternating current and voltage measuring device to be made having a meter with a single scale for all ranges, when operated in the "search" mode.

The use of the invention in combination with an improved rectifier or detector also enables considerably lower voltages to be measured with a higher degree of accuracy, and with greater stability in the presence of temperature changes and in a wider range of frequencies.

In order to measure alternating currents and voltages the meter 14 is supplemented by and combined with suitable rectifiers, condensers and calibrating resistors in the indicating circuit and in such a manner that 40 microamperes A.C. RMS in this portion of the circuit, causes the indicator to read at an exact point, which may be near the center of the scale. Again, in combination with the rest of the circuit this presents at the terminals 10 a resistance of 2500 ohms, resulting in a voltage sensitivity of .1 to 1 volt. The range can then be extended by series multipliers of 22.5 K ohms, 225K ohms and 2.25 megohms to provide additional ranges of 10, 100 and 1000 volts A.C. or larger if desired. Suitable shunt resistors can be used to measure current. Due to the fact that the meter is again used as an indicator, which is now an A.C. indicator, a high degree of accuracy is obtainable since it operates on 40 microamperes of current at a fixed point and has 2400 ohms resistance. As will later appear, in the "search" mode only one scale is needed because of the improved rectifier or detector used and resistors are substituted at $R_y$ and $R_r$ which cause the meter to read at the center of the scale in the same manner as for direct current.

Figure 2:
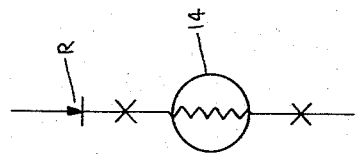
FIG. 2 is a simplified schematic of an alternating current indicator.

FIG. 2 illustrates the more basic concept where the voltage is rectified by a simple half wave rectifier R before being passed through the meter 14.

Figure 3:
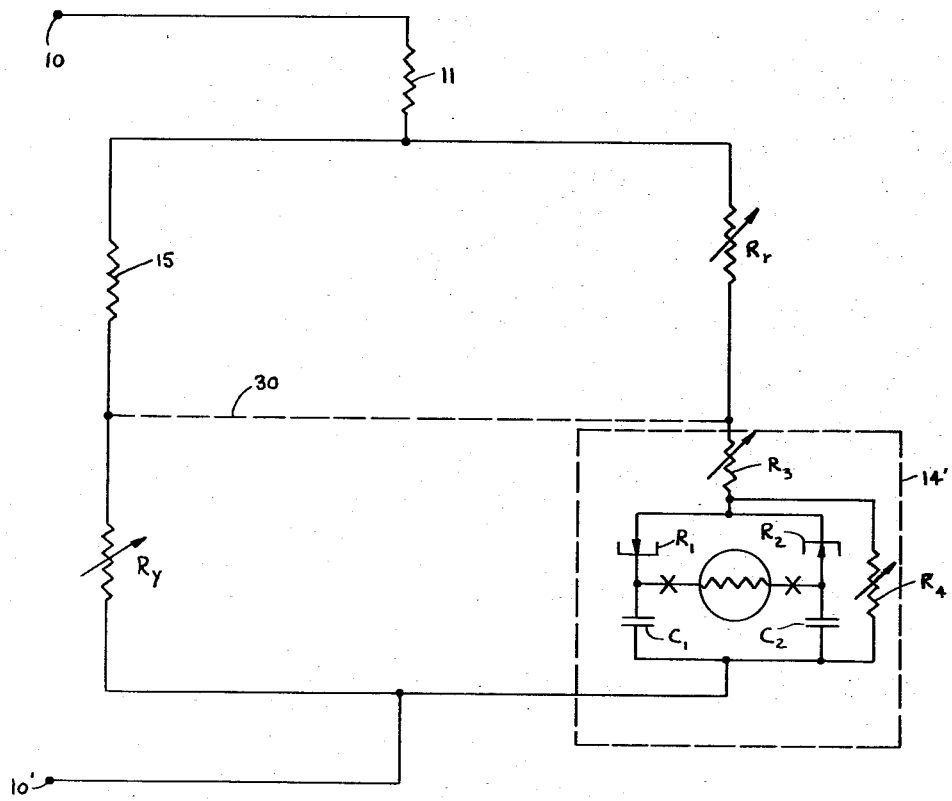
FIG. 3 is a schematic of another alternating current indicator in the indicator circuit.

A more accurate circuit and one which allows the use of the same meter and to eliminate vibration of the pointer, is illustrated in FIG. 3. This figure shows the same configuration of the indicator circuit except that the dotted box 14' now illustrates a more highly accurate meter circuit, employing the same meter 14 with the components added for full wave rectification of the alternating current and with the meter being disposed in a bridge. The bridge includes the rectifiers $R_1$ and $R_2$, connected in opposite directions in the top two adjacent legs by an adjustable resistor $R_3$ to the digital resistor $R_r$. The leads of the meter 14 connect to the bottom ends of the legs containing the rectifiers $R_1$ and $R_2$. The other legs of the bridge comprise 10 mfd. condensers $C_1$ and $C_2$, the upper ends of which are connected to the leads of the meter and the lower ends to the resistor $R_y$. A second adjusting resistor $R_4$ connects from the top to the bottom of the bridge.

The rectifiers $R_1$ and $R_2$ are tunnel diodes and are of a type having a minimum peak to valley ratio more particularly known as backward diodes. They are operated at a low voltage on the reverse or negative side of the characteristic voltage-current curve. Since they are always operated at the same voltage, the element of non-linearity present in most diodes is completely avoided. In addition, since they operate in a tunnel region they are not effected by temperature and are relatively insensitive to frequency changes over a very wide range.

The resistor $R_3$ is adjusted to cause the resistance to the terminals to be 2400 ohms. The resistance $R_4$ is an adjustable shunt around the bridge and is adjusted for calibrating purposes so that the proper amount of current flows through the bridge to cause the pointer to read at mid-scale when the proper current and voltage are applied.

Thus the meter can be made to read .1 volt RMS at mid-scale or the chosen point of indication when put through the usual 100 ohm resistor used to bring the total resistance of the indicator circuit up to 2500 ohms for the purpose of simplifying the range multipliers. The resistors are "dialed" in at $R_y$ and $R_r$ in the same manner as for D.C. measurements, to always bring the pointer to the fixed point on the scale after which the voltage is read from the dial readings.

In the "search" position the resistance inserted at $R_y$ and $R_r$ is equivalent to the dialing of these resistances for .606 volt mid scale. This is determined by the kind of detectors used and for the particular detectors stated, it has been determined that the average of this type of detector requires the dialing of .606 in order to produce convenient reading at a mid point on the dial when reading in .1 to 1 volt range. The type of detector enables a lower voltage to be read using a scale with a greater linearity. Since the current supplied to the indicator is always of a predetermined value as determined by the resistors $R_y$ and $R_r$ and the input resistance is always the same, the same amount of current is always supplied to the indicator, even though the range is changed by the addition of multipliers and therefore a single scale may be used in all the ranges, whether the instrument is being used in the "search" or "digital" mode. The meter merely acts as an indicator on the "digital" range.

Another disadvantage of the conventional instruments resided in the fact that it was difficult to determine the exact position of a pointer relative to the scale. Errors in reading, due to parallax and judgment, were common. As previously stated, in this instrument an indicator may be used in place of the meter. This has the advantage that the indication may be one that does not require an interpretation. This is possible by visual, aural or mechanical means, thus eliminating the human error in taking the reading. It will be apparent that in such instances it has an additional value in that the device may be used by those having a severe impairment of vision.

Since, by this circuit, a predetermined amount of current and voltage is present at the indicator 14, several other types of devices may be substituted for the meter type indicator described to carry out the various aspects of the invention. It is apparent that a device which will show "over," "under" and "desired" voltage current may be used. This can be done in various manners, as will be apparent to those versed in the art.

Figure 4:
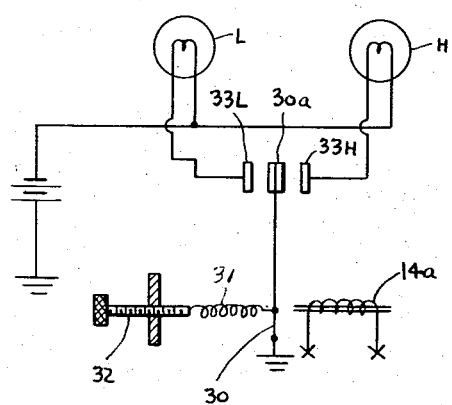
FIG. 4 is a diagrammatic view of another type of indicating device.

For example, a simple means for providing a visual indication where the presence of one light indicates the current or voltage being measured is "low" and another that it is "high" and the absence of a light indicates that the dials have been adjusted to the predetermined position for the calibrated current is illustrated in FIG. 4. In this FIGURE 14a is a winding on an iron core, the coil having a resistance of 2400 ohms. A grounded armature 30 is provided and arranged to be attracted to the core when it is energized, being biased away from the core by a spring 31, the tension of which may be adjusted by an adjustment means 32. The armature has contacts 30a which are swingable between fixed contacts 33L and 33H, the contact 33L being connected to light bulb L and contact 33H being connected to light bulb H. The other side of the filaments of the light bulb are connected together and to one terminal a battery 35, the other terminal being grounded.

When the coil 14a is not energized the spring 31 closes the contacts 30a and 33L and the light L is lit. When current is applied to the coil 14a, if it is lower than the determined amount, the current in the coil 14a is insufficient to move the contact 30a away from the contact 33L. If it is higher than the predetermined amount, then the armature is attracted to the core and the contacts 30a and 33H are closed and the light H lights, indicating that the current is higher than the determined amount. When the exact amount of resistance is dialed in at $R_y$ and $R_r$, the contact 30a will move to the intermediate position where no contacts are made and both lights go out, thus indicating that the exact predetermined amount of current is applied to the coil, and that current can now be read from the dialing mechanism.

It is pointed out that the lights L and H could be replaced by some kind of an audible tone generator, where a low tone indicated that the dialing was low and a high tone that it was high and the absence of tone that the adjustment was correct. In addition it is apparent that the points 30a could be replaced by a flag and the escutcheon provided with three windows and that when it was over the left window it would indicate low dialing and if over the right window, high dialing and when opposite the center window that the dialing was correct. This is similar to the meter type indicator.

Having thus described the invention in some embodiments thereof, I am aware that numerous and extensive departures may be made therefrom without departing from the spirit or scope of the invention as defined by the appended claims.

I claim:

1. A voltage and current measuring instrument having first and second terminals to be inserted in shunt with a voltage to be measured and in series with a current to be measured, a circuit connected between said terminals and comprising a first fixed resistance and a first variable resistance connected to the first terminal, a second variable resistance and an indicator having a fixed resistance connected to the second terminal, said second variable resistance being connected to the other end of the first fixed resistance and said indicator being connected to the other end of the first variable resistance, said variable resistances being mechanically coupled together and operated by a single control and are a plurality of discrete fixed resistances and are arithmetic progression of values one of which is the inverse of the arithmetic progression of values of the other variable resistance.

2. A circuit wherein current may be divided and voltage dropped to provide a predetermined fixed current within the circuit for operating a current operated means having a predetermined sensitivity which comprises a pair of input terminals and a first series circuit connected between the input terminals and comprising a variable resistance in series with the current operated means and a second series circuit arranged to be connected in shunt with the first circuit and comprising a first fixed resistance and a variable conductance in series therewith, said variable conductance being mechanically connected to the variable resistance and, when the resistances are changed in value, the changes in value change as an arithmetic progression of each other, one of which is the inverse of the other.

3. A device as described in claim 2, wherein the value of the conductance and resistance may be changed in steps.

4. A voltage and current measuring instrument having first and second terminals to be inserted in shunt with a voltage to be measured and in series with a current to be measured, a circuit connected between said terminals and comprising a first fixed resistance and a first variable resistance connected to the first terminal, a second variable resistance and an indicator having a fixed resistance connected to the second terminal, said second variable resistance being connected to the other end of the first fixed resistance and said indicator being connected to the other end of the first variable resistance, said variable resistances being mechanically coupled together and operated by a single control, said first fixed resistance being of the same value as the resistance of the indicator and said variable resistances are varied in such a manner that the input resistance to the first and second terminals remains constant.

5. A device as described in claim 4, wherein said indicator device is a meter accurately calibrated at least at a single point intermediate the ends of the scale.

6. A device as described in claim 5, wherein said variable resistances are adjustable to provide the rated current for the meter at the calibrated point.

7. A device as described in claim 4, wherein said first variable resistance means comprises a decade resistance network with the resistance of the indicator as a base of the first decade and said second variable resistance means comprises a decade conductance network with the resistance of the indicator as a base of the first decade.

8. A voltage and current measuring instrument having first and second terminals to be inserted in shunt with a voltage to be measured and in series with a current to be measured, a circuit connected between said terminals and comprising a first fixed resistance and a first variable resistance connected to the first terminal, a second variable resistance and an indicator having a fixed resistance connected to the second terminal, said second variable resistance being connected to the other end of the first fixed resistance and said indicator being connected to the other end of the first variable resistance, said variable resistances being mechanically coupled together and operated by a single control, switch means for switching said variable resistances into and out of the circuit and a third and fourth fixed resistance means is simultaneously switched out and into the circuit in place of the variable resistance.

9. A voltage and current measuring instrument having first and second terminals to be inserted in shunt with a voltage to be measured and in series with a current to be measured, a circuit connected between said terminals and comprising a first fixed resistance and a first variable resistance connected to the first terminal, a second variable resistance and an indicator having a fixed resistance connected to the second terminal, said second variable resistance being connected to the other end of the first fixed resistance and said indicator being connected to the other end of the first variable resistance, said indicator including a bridge, two adjacent legs comprising a pair of tunnel diodes disposed in the legs and arranged to operate in opposite directions and in the backward region and a pair of capacitors disposed in the opposite adjacent legs, a meter disposed across the bridge and variable resistance means is shunted around the bridge.

10. A circuit wherein current may be divided and voltage dropped to provide a predetermined fixed current within the circuit for operating a current operated means having a predetermined sensitivity which comprises a pair of input terminals and a first series circuit connected between the input terminals and comprising a variable resistance in series with the current operated means and a second series circuit arranged to be connected in shunt with the first circuit and comprising a first fixed resistance and a variable conductance in series therewith, said first fixed resistance and the resistance of the current operated means being equal and the variable conductances and resistance being of such a value and varied in such a manner that the input resistance at the terminals is constant throughout the range.

11. A circuit wherein current may be divided and voltage dropped to provide a predetermined fixed current within the circuit for operating a current operated means having a predetermined sensitivity which comprises a pair of input terminals and a first series circuit connected between the input terminals and comprising a variable resistance in series with the current operated means and a second series circuit arranged to be connected in shunt with the first circuit and comprising a first fixed resistance and a variable conductance in series therewith, said variable resistance and variable conductance being arranged to be changed in digital steps consisting of a series of significant figures and the value of the resistance therefor, is determined by the formulae:

$$R_y = \frac{\text{base } R \text{ current operated means}}{(N_1-1) - \frac{N_n}{10^{sf}}}$$

$$R_r = (N_1-1) - \frac{N_n}{10^{sf}} \text{ base } R \text{ of current operated means}$$

whereby $R_y$ is the resistance value of the conductance, and $R_r$ the resistance of the resistance and $sf$ is the significant figure, $N_1$ is the integer number of the first significant figure, and $N_n$ is the integer number of the $n$th significant figure.

12. A voltage and current measuring device comprising a circuit having input terminals for connecting in series with a current source and in shunt with a voltage source, an indicator circuit for indicating the current and voltage applied to said terminals comprising an indicator having a predetermined resistance, a first variable resistance means of predetermined value connected in series with the indicator and the source of voltage and current, a fixed resistance of the same value as that of the indicator and a second variable resistance means of predetermined value, means for indicating the predetermined value of current and voltage, controlled by said variable resistance means, by at least one significant figure, means for connecting said fixed resistance in series with the second variable resistance means and in shunt with said first variable resistance and said indicator, the values of all of the variable resistances being related to the value of the resistance of the indicator as a base as determined by the formulae:

$$R_y = \frac{\text{base } R \text{ of Indicator}}{N_1-1}$$

$$R_r = (N_1-1) \text{ base } R \text{ of indicated}$$

$$R_r = (N_1-1) \text{ base } R \text{ of indicator}$$

where:
$R_y$ is the value of the variable shunt resistance,
$R_r$ is the value of the variable series resistance,
base R of indicator is the resistance of the indicator,
$N_1$ is the integer number of the first significant figure.

13. A circuit for measuring current and potential comprising a first variable resistance means comprised of a plurality of resistors of predetermined value and switch means for selectively inserting said resistors singly and in combination in steps to provide a predetermined resistance in series, and in one position providing zero resistance, with an indicator having a fixed resistance of a predetermined value, a second fixed resistance having a value equal to the resistance value of the indicator in series with a second variable resistance means comprised of a plurality of resistors and switch means arranged to connect said last resistors singly and in combination to provide predetermined resistance which may be varied in steps and for connecting said second variable resistance means in series with said second fixed resistance and arranged to provide an open circuit in at least one position and in the position where said second variable resistor means is included in series and connecting said second fixed and second series resistance means in shunt with said first resistance means and said indicator, the value of said variable means being such that the resistance represented by said circuit to said voltage and current remains constant.

14. A device as described in claim 13, wherein said variable resistance means are ganged together to cause the resistances thereof to vary simultaneously.

15. A device as described in claim 14, wherein said resistance means and said switch means are operated by common dials common to both resistance means and marked in digits by a series of significant figures.

16. A device as described in claim 15, where the value of the resistance of the indicator is used as the base for computing the values of the other resistors and wherein the fixed resistor is of equal value to the base and the value of the resistances used for the first and second resistances means are computed from the formulae:

$$R_y = \frac{\text{base } R \text{ of indicator}}{N_1-1}$$

$$R_r = (N_1-1) \text{ base } R \text{ of indicator}$$

where
$R_y$ is the value of the shunt resistance means,
$R_r$ is the value of the series resistance means, and
$N_1$ is the integer number of the first significant figure.

17. A current and voltage measuring instrument comprising a circuit for insertion in series and in shunt with a voltage and current source, said circuit having input terminals and including an indicator comprising a meter having a scale calibrated at a predetermined point intermediate the ends of the scale, means in combination with said meter for maintaining a constant input impedance at said terminals and for adjusting the current to the meter for causing said meter to indicate at said calibrated point, said adjusting means having indicia cooperating therewith whereby the voltage or current being measured may be read from the indicia, and means arranged to be connected into said circuit in place of said adjusting means for enabling said meter to be used as a conventional meter.

References Cited

UNITED STATES PATENTS

| | | | |
|---|---|---|---|
| 819,355 | 5/1906 | Leeds | 324—98 |
| 2,495,752 | 6/1945 | Montgomery | 324—98 X |
| 3,012,192 | 12/1961 | Lion | 324—57 |

OTHER REFERENCES

Electrical Measurements, F. K. Harris, John Wiley & Sons, N.Y., 1952, pp. 85–88. (Copy in Group 260.)

Electrical Measurement Analysis, E. Frank, McGraw-Hill, N.Y., 1959, pp. 59–64. (Copy in Group 260.)

Wireless World, "Meter Shunts," pp. 313–14, July 1953. (Copy in Group 260.)

RUDOLPH V. ROLINEC, *Primary Examiner.*

WALTER L. CARLSON, *Examiner.*

J. J. MULROONEY *Assistant Examiner.*

UNITED STATES PATENT OFFICE
CERTIFICATE OF CORRECTION

Patent No. 3,356,943              December 5, 1967

David S. Wise

It is hereby certified that error appears in the above numbered patent requiring correction and that the said Letters Patent should read as corrected below.

Column 11, line 65, for "whereby" read -- wherein --; column 12, line 17, strike out "$R_r=(N_1-1)$ base R of indicated".

Signed and sealed this 17th day of December 1968.

;EAL)
.ttest:

lward M. Fletcher, Jr.
ttesting Officer

EDWARD J. BRENNER
Commissioner of Patents